United States Patent [19]
Barecki et al.

[11] 3,797,887
[45] Mar. 19, 1974

[54] SEAT FOR URBAN MASS TRANSIT VEHICLES

[75] Inventors: Chester J. Barecki; Alexander A. Karrip, both of Grand Rapids, Mich.

[73] Assignee: American Seating Company, Grand Rapids, Mich.

[22] Filed: Aug. 15, 1972

[21] Appl. No.: 280,793

Related U.S. Application Data

[62] Division of Ser. No. 157,345, June 28, 1972, Pat. No. 3,737,198.

[52] U.S. Cl............... 297/454, 297/450, 297/445, 297/232, 297/DIG. 2
[51] Int. Cl............... B60n 1/06, A47c 3/00
[58] Field of Search ........... 297/231, 232, 450, 451, 297/452, 455–458, 445, DIG. 1, DIG. 2

[56] References Cited
UNITED STATES PATENTS

| | | | |
|---|---|---|---|
| 3,845,111 | 7/1958 | Barecki et al.......................... | 297/451 |
| 3,026,145 | 3/1962 | Galbrath............................... | 297/455 |
| 3,318,635 | 5/1967 | Barecki et al....................... | 297/232 X |
| 3,230,007 | 1/1966 | Spangler et al..................... | 297/457 X |
| 3,630,566 | 12/1971 | Barecki............................... | 297/450 X |

Primary Examiner—Casmir A. Nunberg

[57] ABSTRACT

A two-passenger seat for urban mass transit vehicles includes a tubular frame attached to an upright wall of the vehicle and a one-piece plastic shell body-contoured to accommodate two passengers side-by-side. The individual passenger sections each define a back recess for receiving a bucket-contoured back insert, and a seat recess for receiving a contoured seat insert. The body contour in the shell is extended beyond the inserts to provide a rigid upwardly contoured periphery about each section for securing each passenger in place during sharp turns.

7 Claims, 11 Drawing Figures

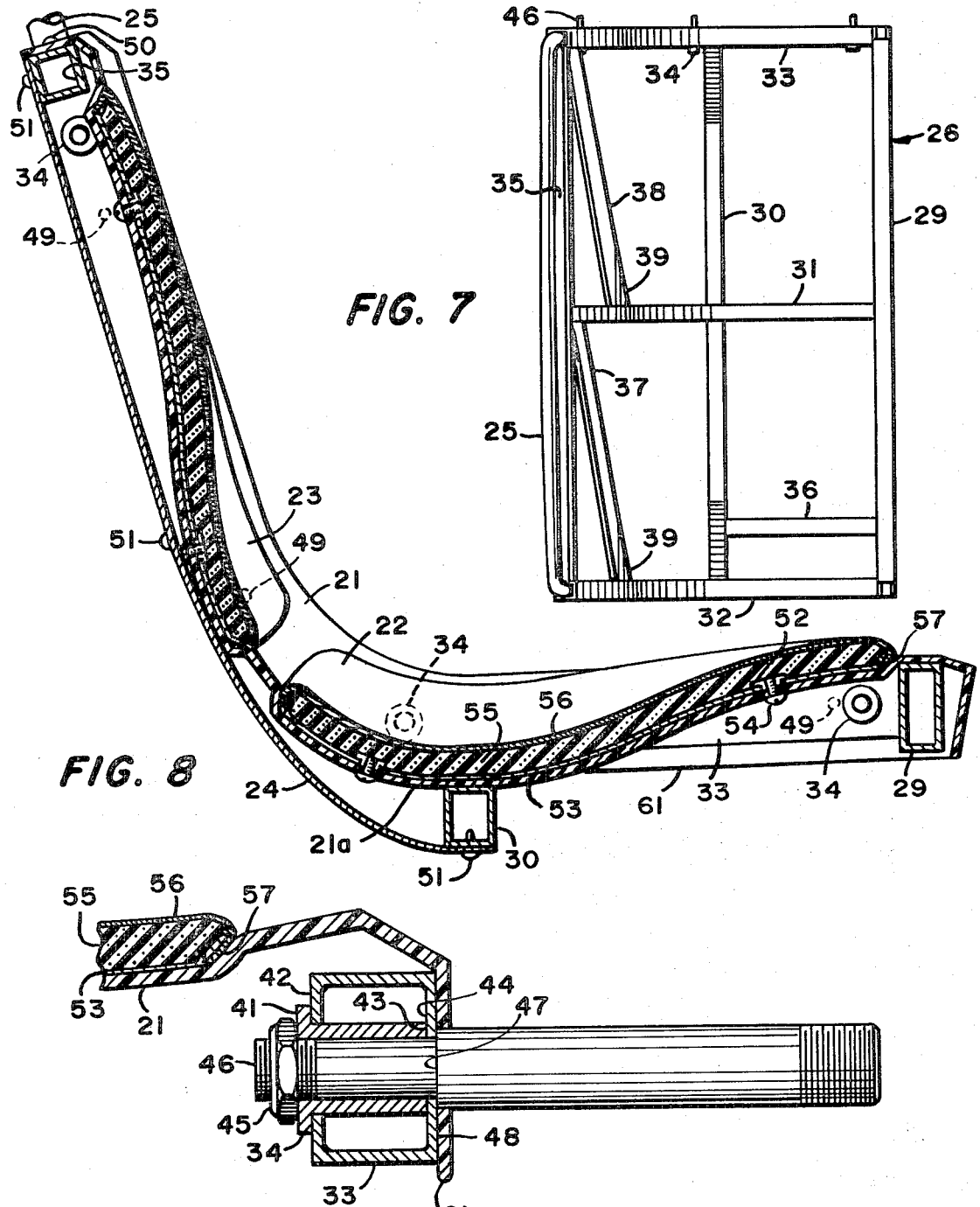

3,797,887

SEAT FOR URBAN MASS TRANSIT VEHICLES

RELATED APPLICATION

This is a divisional application of subject matter disclosed but not claimed in our copending, co-owned application for "Rapid Transit Seating," Ser. No. 157,345, filed June 28, 1971 now U.S. Pat. No. 3,737,198.

BACKGROUND AND SUMMARY

The present invention relates to a transit seat which is particularly suited for use in a mass transportation vehicle, such as a bus or a rapid transit train.

Plastic shells have been used in transit seats, the principal advantages being in lower costs in maintenance and manufacturing. The principal use of plastic seats has been as so-called longitudinal seating—that is, seats that extend parallel to the direction of elongation of the vehicle, with the back of the seat being mounted to the upright side wall of the vehicle. Plastic seats have, however, been used as transverse seats—that is, seats which extend transversely of the direction of elongation of the vehicle and having one side attached to the wall.

Heretofore, however, plastic shells used in transportation seating have not been as comfortable as is desired, nor have they afforded the opportunity to incorporate a desired color scheme into the vehicle. The lack of comfort is attributed chiefly to the relative flatness of the seat portion, so as to permit adjacent passengers to slide into each other during sharp turns (in the case of transverse seats) and stopping and starting (in the case of longitudinal seats).

Another problem has arisen, and it has become particularly acute in large cities; and it is the problem of vandalism. Cushioned seats are not only easier to destroy since they are subject to tearing, but they are also more expensive to repair or to replace. Prior plastic shells, if defaced or damaged to the extent that they must be replaced have required replacement of the entire shell.

The present invention provides a two-passenger seat for urban mass transit vehicles which includes a tubular frame supporting a one-piece plastic shell. The shell is body-contoured to seat the two passengers side by side.

The individual passenger sections of the seat each define a back recess for receiving a contoured back insert, and a seat recess for receiving a contoured seat insert. The body contour in the shell is extended beyond the inserts to provide rigid upwardly contoured peripheral support regions about each passenger section for securing each passenger in place during sharp turns.

In addition, the inserts may be padded for additional comfort, so as to provide a somewhat more luxurious seat than a conventional plastic shell while maintaining the basic qualities of durability, economy, and ease of maintenance inherent in the plastic seats. The inserts further provide the ability to design a desired color scheme into the seat.

In the event of vandalism to the inserts, which cover the largest exposed portion of the seat, an individual insert which is damaged may be removed and replaced with relatively minor cost of material and labor.

Other features and advantages of the present invention will be apparent from the following detailed description of a preferred embodiment accompanied by the attached drawing.

THE DRAWING

In the accompanying drawings,

FIG. 1 is a front perspective view of a two-passenger cantilever transverse seat with an aisle arm rest, the view being taken from the aisle side;

FIG. 2, a rear perspective view of the structure shown in FIG. 1;

FIG. 3, a front perspective view similar to FIG. 1 but without the aisle arm rest;

FIG. 4, a rear perspective view similar to FIG. 3;

FIG. 5, a front perspective view of the tubular steel frame of the cantilever seat shown in FIG. 1;

FIG. 6, a rear perspective view of the structure shown in FIG. 5, as seen from the wall side to show the three wall mounting apertures;

FIG. 7, a top plan view of the steel frame shown in FIG. 5 with the two diagonal braces formed of plate material and extending from the top of the side rails below the tangent point of the curve of the center and aisle rail members;

FIG. 8, a sectional view of the seat near the center and through the seat pad and back pad to show the fastenings for the seat pad and back pad, the shell secured to the frame, and showing also the fastening elements for anchoring the wall rail to the wall of the vehicle;

FIG. 9, a broken sectional view of the edge of the wall side of the frame and shell to show how the wall rail may be attached to the vehicle wall;

FIG. 10, a broken perspective view of the aisle side rail to show the attachment of the arm rest; and FIG. 11, a broken view of the aisle arm rest as seen from the rear wall position, showing the two attachment bolts in phantom as well as the two weld units as they are secured to the frame side wall.

DETAILED DESCRIPTION

In the illustrated embodiment, we have provided a tubular frame for a cantilever seat adapted to suspend the plastic shell of the instant invention from one side upon the side wall of the vehicle. The invention, however, is not limited to use with a cantilever seat frame.

Figure 2:
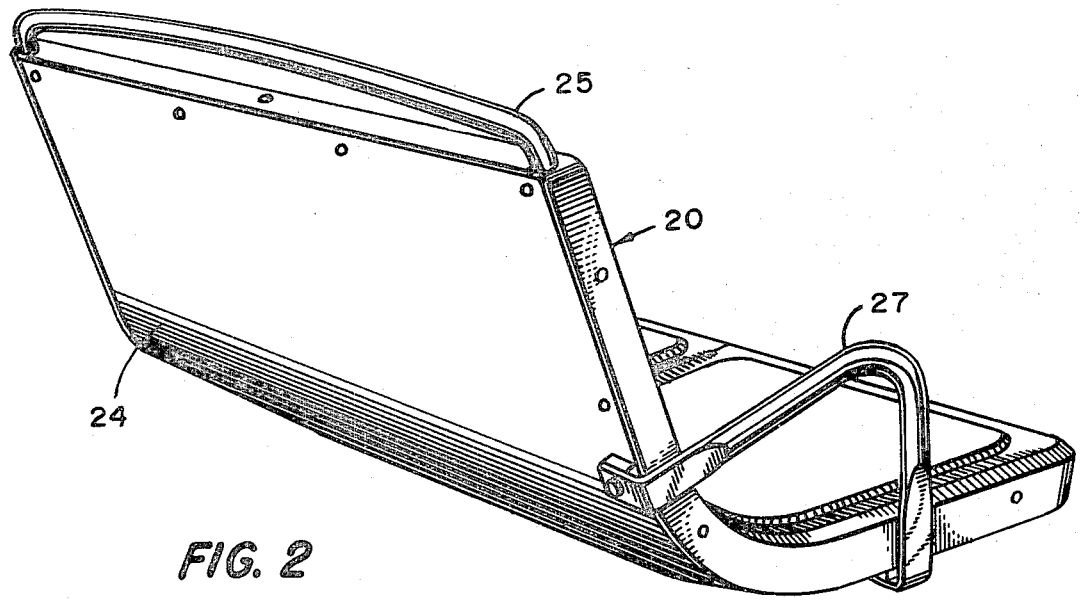
Figure 3:
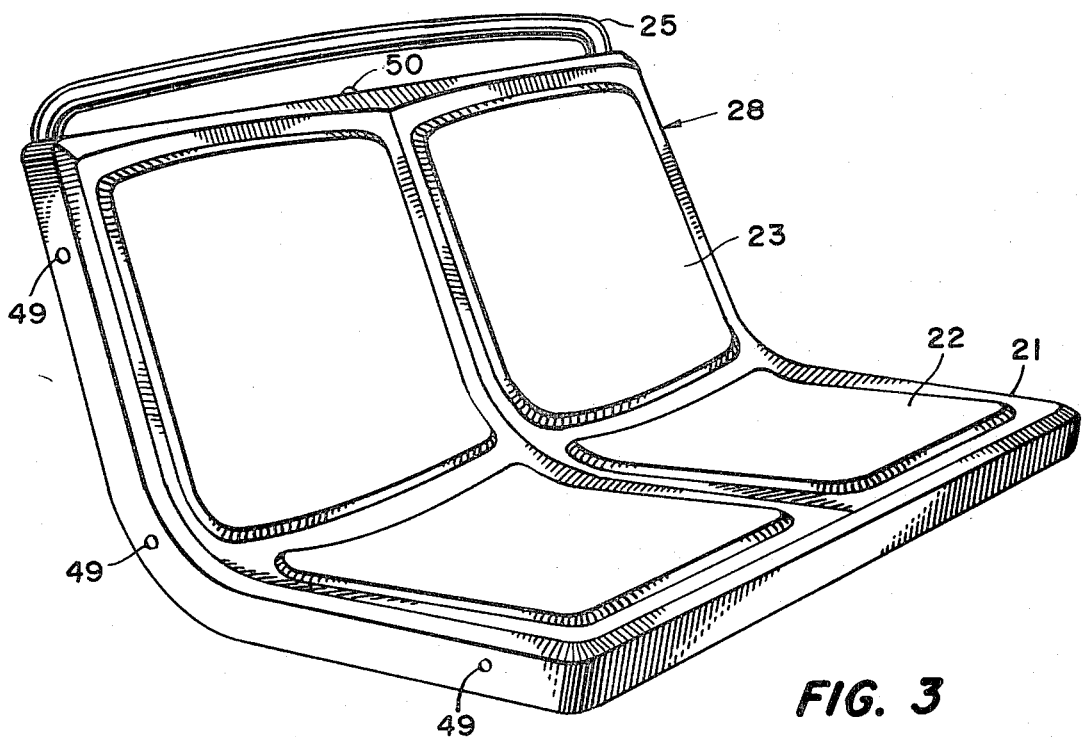
Figure 4:
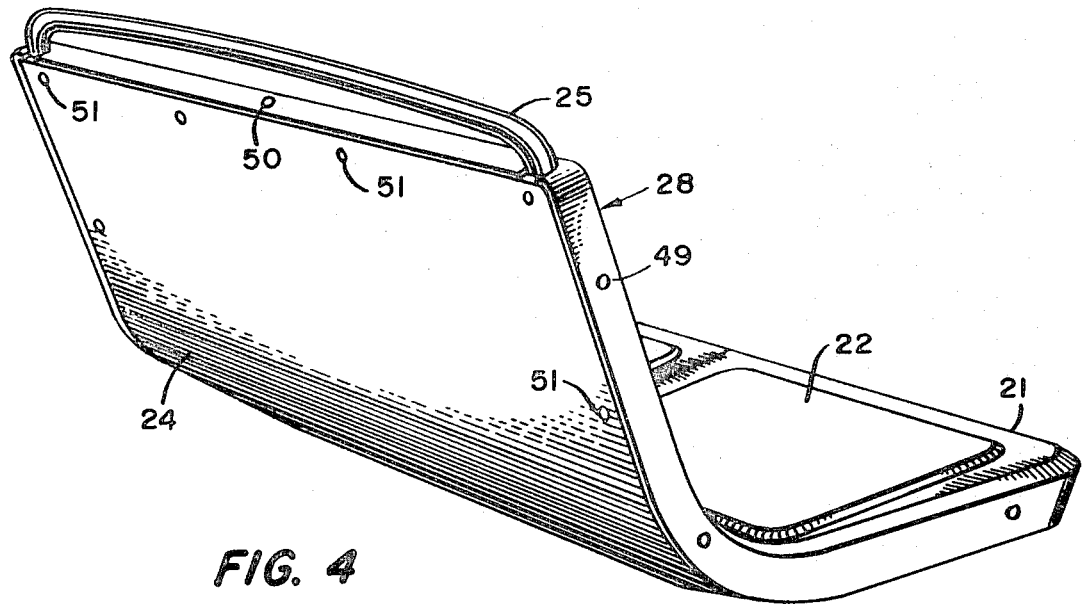

Referring to the drawings, the seat 20 has a one-piece contoured plastic shell 21, with seat insert pads 22, back insert pads 23, back panel 24, and a grab rail 25, held together by a tubular steel or metal frame 26. The frame may be braced on the aisle side by an arm rest 27, as shown in FIGS. 1 and 2, or the seat may be an armless seat 28, as shown in FIGS. 3 and 4.

Figure 1:
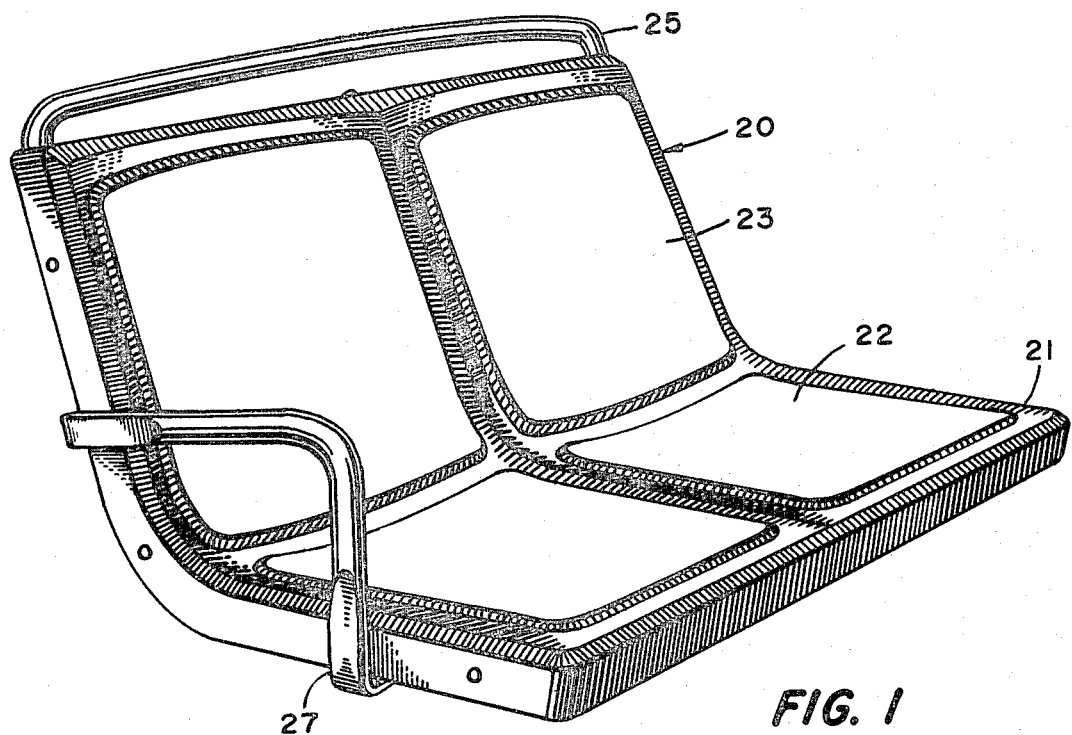

The contour of the plastic shell 21 is such as to form two separate passenger sections generally designated 21a and 21b in FIG. 1. Each of the sections 21a, 21b, in turn, is provided with a contoured seat recess 22a (FIGS. 8 and 9) for receiving the contoured seat inserts 22, and a back recess 23a (FIG. 8) for receiving the back insert pad 23.

Figure 5:
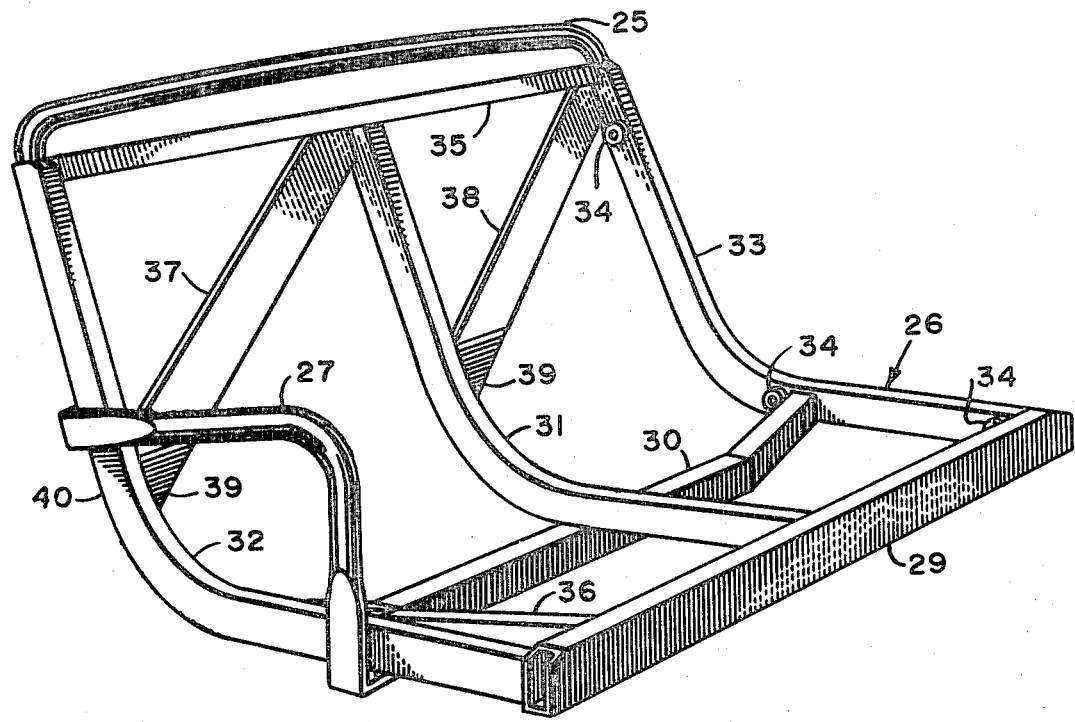
Figure 6:
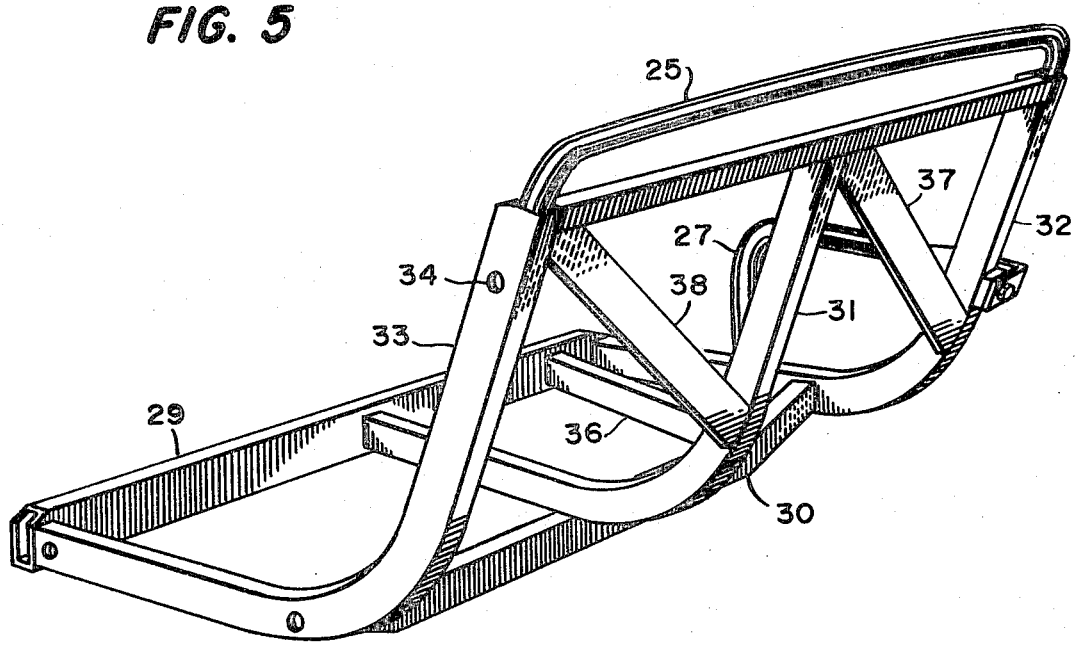
Figure 10:
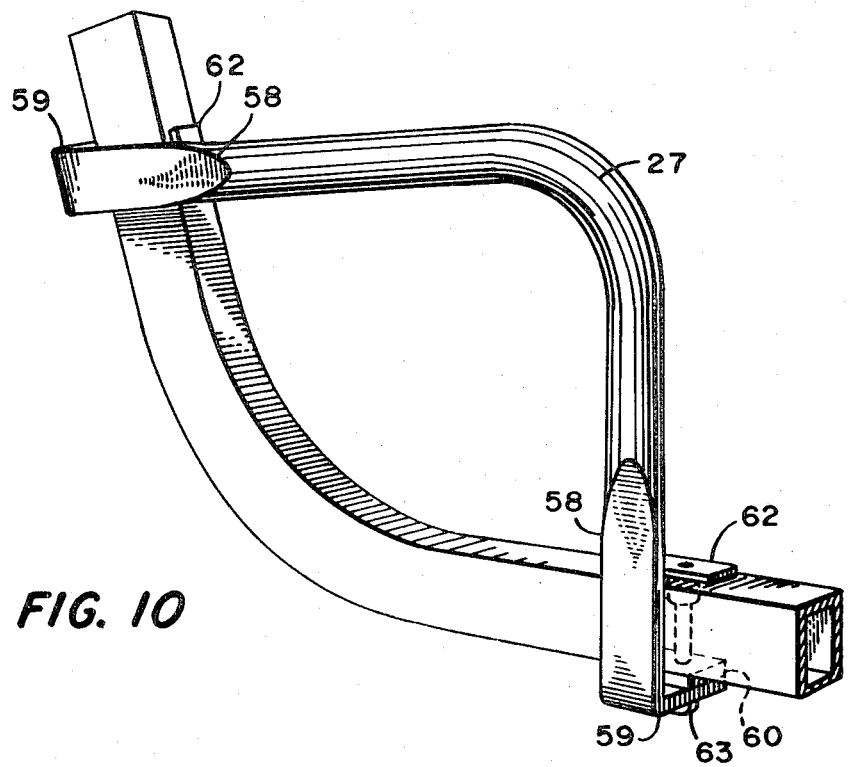
Figure 11:
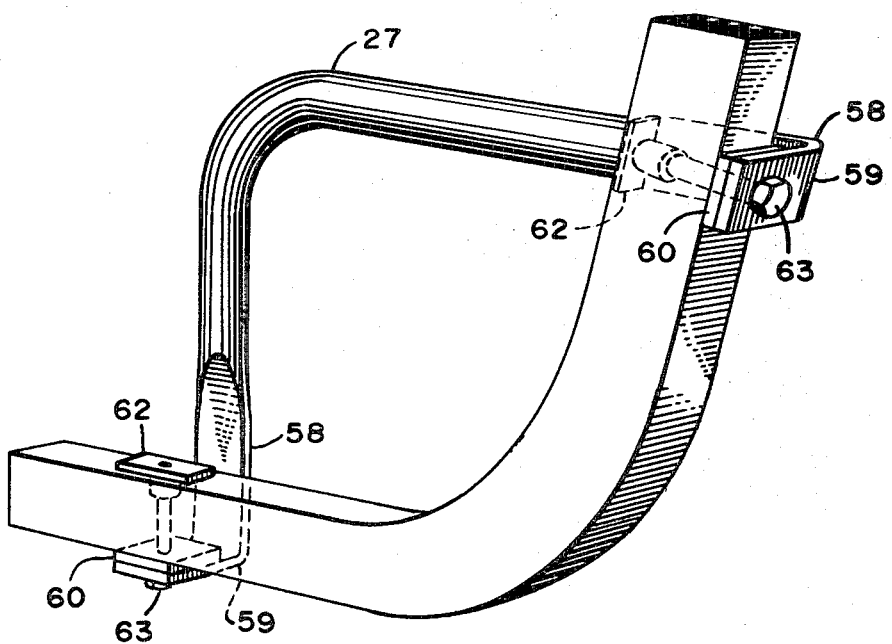

The tubular steel frame 26, as shown best in FIGS. 5, 6 and 7, may be formed of rectangular or square steel tubing, which consists of a front cross tube or member 29, and a center cross tube 30 which is lower in the center to pass under the central rail 31 and to allow ample room for the seat buckets 21c, as shown in FIG. 8. The frame also comprises an aisle side rail 32, a wall side rail 33 with its three shoulder bushings 34 to hold the wall attachment elements, an upper cross tube or member 35, and an extra support tube 36 spanning the space between the front cross tube 29 and the center cross tube 30 on the aisle side of the frame. A hand rail or grab rail 25 may be formed of round tubing and bent in a curve with its ends projecting into the opened ends of the side rails 32 and 33 and welded in place. Two diagonal braces 37 and 38 which may be made of plate steel are placed between a side rail and the center or intermediate rail 40. Their bottom ends 39 can extend below the tangent point or the curve in the rail, and the lower portion is curved slightly to align with the curve of the rail.

As shown in FIG. 9, a shoulder bushing 34 is placed into each hole in the wall rail 33 so that the shoulder 41 of the bushing rests against the outer rail 42 of the tube 33, while the end face 43 of the bushing rests against the inner wall 44 of the tube for maximum strength without danger of deforming the tube when nut 45 is tightened on the bolt stud 46 which has a shoulder 47 pressing against the outside surface 48 of the tube 33. The bolt stud 46 is adapted to be inserted into the wall support and to be anchored to a wall anchor (not shown) in the vehicle wall.

As shown in FIG. 8, there are three shoulder bushings 34 for attaching the seat to the wall, pop rivets 49 on the side, and one pop rivet 50 on the upper edge for attaching the plastic shell to the tubular frame, and screws 51 are shown for attaching the back panel to the frame. Near each corner of the seat pad and back pad, there is a weld nut 52 attached to the thin metal inner liner 53 into which a screw 54 is inserted through the plastic shell. A pad includes a thin metal inner liner 53, a slab of foam material 55, and an upper upholstery panel 56 glued to the inner panel along its edges 57.

Referring now particularly to FIGS. 1, 3, 8 and 9, the bucket effect of the seat recesses 22a, when the associated seat insert pads 22 are fastened therein, is continued out onto the more rigid portion of the plastic shell 21. That is, the plastic shell is formed with upwardly inclined side peripheral areas 67 which are contoured to form a continuation of the contoured seat insert pad 22. The inclination of the contoured area 67 is relatively slight toward the knee portion of the seat, and it becomes increasingly more vertical proceeding toward the rear portion of the seat insert pad 22, as at 68 in FIG. 8. This continuation of the contour onto the plastic shell performs an important function of holding the passenger secure during sharp turns of the vehicle when the seat is a transverse seat. Similarly, if the seat is used as a longitudinal seat, a passenger is securely held by these rigid peripheral areas of the plastic shell during stops and starts.

Similarly, the contour of the lower spine portion of the back insert pad 23 is continued onto a peripheral area 69 formed in the plastic shell 21. It will be observed from FIG. 8 that a deep bucket effect is obtained while at the same time preventing sliding of each individual passenger due to the separate passenger contoured sections, so that the passengers do not slide into each other.

The seat recess 22a and back recess 23a may be separated by a raised portion of the shell 70 in FIG. 8 at a location where no major portion of the passenger's weight is borne so that a person sitting in the seat does not experience this rigid portion but rather experiences the softer insert pads 22, 23. The raised intermediate portion 70 also is contoured according to the bucket effect achieved by the adjacent portions of the seat insert pad 22 and back insert pad 23.

This continuation of the bucket contour of the individual seating sections 21a, 21b, produces a separating raised portion of ridge, designated 72 in FIGS. 1 and 3.

In summary, the present invention provides in combination with the tubular support frame, whether cantilever or otherwise, a seat including a one-piece plastic shell providing side-by-side passenger sections. Each section is molded to provide a bucket effect and each section defines recesses for receiving similarly contoured seat and back insert pads. Thus, the economy and durability of plastic seat shells is maintained while also providing the greater comfort of padding at the seat and back locations. Further, the plastic shell is formed so as to provide peripheral portions beyond the insert pads which form a continuation of the bucket contour and thus a rigid support for each individual passenger, holding him in his seating section in the event of abrupt sideways motion. The inserts are easily replaced if worn or damaged by vandalism, or if it is desired to change the color scheme of the vehicle, without having to change the plastic shell or its attachment to the frame.

Having thus described in detail one embodiment of the invention, persons skilled in the art will be able to substitute equivalent elements for those which have been disclosed and to modify certain of the structure which has been illustrated while continuing to practice the principle of the invention; and it is, therefore, intended, that all such modifications and substitutions be covered as they are embraced within the spirit and scope of the appended claims.

We claim:

1. A passenger chair for a mass transit vehicle comprising: a frame; a one-piece rigid plastic shell mounted on said frame and including a bucket-contoured passenger section defining at least one recess in the seat area of generally uniform depth, said shell being raised laterally of said recess to continue the contour thereof and form a passenger-supporting peripheral border on each side of said recess to support a passenger during sideways abrupt motion; an insert mounted to said shell in said recess and having a thickness approximately equal the depth of said recess to provide a passenger support surface at a substantially constant distance away from its associated recess and conforming to the bucket contour of said shell; and fastener means for releasably securing said insert to said shell.

2. The chair of claim 1 wherein said chair is adapted for a plurality of passengers located side-by-side and wherein said shell defines two separate recesses for each passenger location including a seat recess and a back recess, and wherein said insert includes a seat insert member received in each seat recess of said shell and a back insert member received in the back recess of said shell; said fastener means including means for releasably securing said members to said shells independently.

3. The chair of claim 1 wherein said shell is formed to provide two of said passenger sections for two passengers side by side, the peripheral rigid support areas of said shell being joined together on the adjacent sides of said passenger sections to form a raised ridge separating said passengers.

4. A chair for a mass transit vehicle adapted to seat a plurality of passengers side-by-side, comprising: frame means; a one-piece plastic shell mounted on said frame means and forming side-by-side bucket contours, one for each passenger location, each passenger contour further providing recess means in the seat and back areas thereof for receiving inserts, said shell continuing the bucket contour laterally beyond said recesses to provide rigid peripheral passenger support regions securing a passenger during abrupt sidewise motion; insert means received in said recess means on each passenger side, each insert means comprising a member which when occupied by a passenger provides a passenger support surface which is raised above the bottom of said recess and forms a continuation of the bucket contour of said shell, whereby said insert cooperates with said rigid peripheral passenger support regions of said shell to provide comfort and support for said passenger; and fastener means for releasably securing said insert means in said recess means of said plastic shell.

5. The chair of claim 4 wherein each passenger section includes a deepening bucket contour from the knee area to the back of the seat area, and wherein each of said inserts comprises a flexible pad to provide passenger comfort.

6. The seat of claim 4 wherein each passenger contour provides a lower seat recess and an upper back recess adapted to receive respectively a seat insert and a back insert, said recesses in each passenger contour being separated from the recesses in the adjacent passenger contour by a transverse raised ridge formed in said shell.

7. The seat of claim 6 characterized in that the peripheral rigid support areas in said shell adjacent each other form a raised separating ridge between two passengers.

* * * * *